United States Patent
Sandler et al.

(10) Patent No.: US 8,199,015 B2
(45) Date of Patent: Jun. 12, 2012

(54) THERMALLY CONTROLLED DUTY CYCLE REGULATION IN AN RFID MODULE

(75) Inventors: Robert I Sandler, Melville, NY (US); David E. Bellows, Wantagh, NY (US); Martin J. Strzelczyk, New Market, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 578 days.

(21) Appl. No.: 12/477,367

(22) Filed: Jun. 3, 2009

(65) Prior Publication Data

US 2010/0308973 A1    Dec. 9, 2010

(51) Int. Cl.
*G08B 13/14* (2006.01)
(52) U.S. Cl. .................. 340/572.1; 340/595
(58) Field of Classification Search ........... 340/572.1, 340/595, 445
See application file for complete search history.

(56) References Cited

U.S. PATENT DOCUMENTS

| | | | |
|---|---|---|---|
| 7,339,984 B1 * | 3/2008 | Daou | 375/225 |
| 7,415,438 B1 | 8/2008 | Berman et al. | |
| 7,424,099 B2 | 9/2008 | Roberts et al. | |
| 2003/0182033 A1 * | 9/2003 | Underdahl et al. | 701/29 |
| 2004/0227946 A1 * | 11/2004 | Li et al. | 356/416 |
| 2009/0052105 A1 * | 2/2009 | Soleimani et al. | 361/103 |
| 2009/0174263 A1 * | 7/2009 | Baarman et al. | 307/104 |

FOREIGN PATENT DOCUMENTS

WO    2009026059 A1    2/2009

OTHER PUBLICATIONS

International Search Report and Written Opinion for International Application No. PCT/US2010/035255 mailed on Aug. 27, 2010.

* cited by examiner

*Primary Examiner* — Shirley Lu

(57) ABSTRACT

A system and methods for measuring the temperature of an RFID reader module and inserting a delay in the RFID reader's duty cycle to prevent the RFID reader from initiating a thermal shutdown. The system and methods are self-adaptable, therefore incurring the benefit regardless of the design of the RFID reader host and its associated heat sink. The system and methods also provide for archiving the collected data and analyzing the data providing the ability to improve the design of the RFID reader host.

17 Claims, 7 Drawing Sheets

THERMALLY CONTROLLED DUTY CYCLE REGULATION IN AN RFID MODULE

TECHNICAL FIELD

The subject invention relates generally to radio-frequency identification (RFID), and more particularly to managing the duty cycle of an RFID reader module to prevent RFID reader module overheating and protective shutdown.

BACKGROUND

RFID technology has become prevalent in today's society as a means of identifying objects in transit. The objects can be anything from vehicles passing through a toll plaza on a highway and lost pets to merchandise leaving a store and parts traveling along on a manufacturing line. In each of the previously described examples, the mechanism is similar, an RFID tag, activated by an RFID reader, transmits its identity information to the RFID reader for further processing.

Typically, a vendor provides an RFID reader module to parties interested in developing an RFID system by incorporating the RFID reader module in a host device. The host device is responsible for powering the RFID reader module and providing an adequate heat sink to dissipate any heat buildup from the operation of the RFID reader module. In some cases, the host design is not sufficient to provide the heat sink necessary to prevent the reader module from overheating.

In today's RFID reader technology, the circuits powering the RFID reader module are power inefficient and lead to the buildup of heat in the RFID reader module. The RFID reader module provides overheating protection for itself by including a temperature-measuring component and control logic sufficient to shut down the RFID reader module if the RFID reader module approaches a temperature that would damage the RFID reader module. Although this system satisfies the need of protecting the RFID reader module, it is unacceptable to the host device for the reader module to become inoperative at just the time when the host is reading the greatest amount of RFID data.

In another shortcoming of the existing RFID systems, different host devices have different designs and requirements so it is unacceptable to design the reader module to include the heat dissipation capabilities necessary to prevent the RFID reader module from overheating in all circumstances. Market pressure is building to provide an RFID reader module that is more intelligent in its ability to regulate its operation and prevent itself from entering a thermal shutdown if the host device is not capable of dissipating heat at a rate sufficient to allow continued operation.

Accordingly, inefficiencies in existing RFID reader modules, variations in host device implementations and expectations for uninterrupted operation have created market demand for an RFID reader module that can automatically determine whether it is overheating and take steps to moderate its operation so it can continue to function without entering a thermal shutdown.

SUMMARY

The following presents a simplified summary in order to provide a basic understanding of some of the aspects described herein. This summary neither is an extensive overview nor intended to identify key or critical elements or to delineate the scope of the various aspects described herein. The sole purpose of the summary is to present some concepts in a simplified form as a prelude to the more detailed description presented later.

The disclosure describes systems and methods for monitoring the temperature of an RFID reader module and adjusting the duty cycle of the RFID reader module to prevent the RFID reader module from overheating and entering a thermal shutdown mode. The method modifies the existing control logic of an RFID reader module to analyze the temperature trend of the RFID reader module, and inserts a programmable delay mechanism into the duty cycle operation to reduce the duty cycle read rate and accordingly lower the amount of heat generated by the RFID reader module. The method is adaptive based on the heat dissipation characteristics and environmental conditions associated with the particular implementation and use of the RFID reader module.

In another aspect, the system can collect temperature trend data and duty cycle data from the RFID reader module for analysis and use in designing future generations of host devices. For example, a subsequent analysis of temperature trend data can determine if the heat sink is sufficient for intended operation by reviewing the reduction in duty cycle required to maintain operation of the RFID reader module.

To the accomplishment of the foregoing and related ends, certain illustrative aspects are described herein in connection with the following description and the annexed drawings. These aspects are indicative of various ways to practice the invention, all of which are intended to be covered herein. Other advantages and novel features may become apparent from the following detailed description when considered in conjunction with the drawings.

DETAILED DESCRIPTION

Various embodiments are now described with reference to the drawings. In the following description, for purposes of explanation, numerous specific details are set forth in order to provide a thorough understanding of one or more embodiments. It may be evident, however, that the various embodiments can be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

Furthermore, the one or more embodiments can be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips . . . optical disks (e.g., compact disk (CD), digital video disk (DVD) . . . ), smart cards, and flash memory devices (e.g., card, stick). Additionally it should be appreciated that computer communication media includes a carrier wave that can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope of the disclosed embodiments.

Various embodiments are presented in terms of systems that can include a number of components, modules, and the like. It is to be understood and appreciated that the various systems can include additional components, modules, etc. and/or cannot include all of the components, modules, etc. discussed in connection with the figures. A combination of these approaches may also be used.

Figure 1:
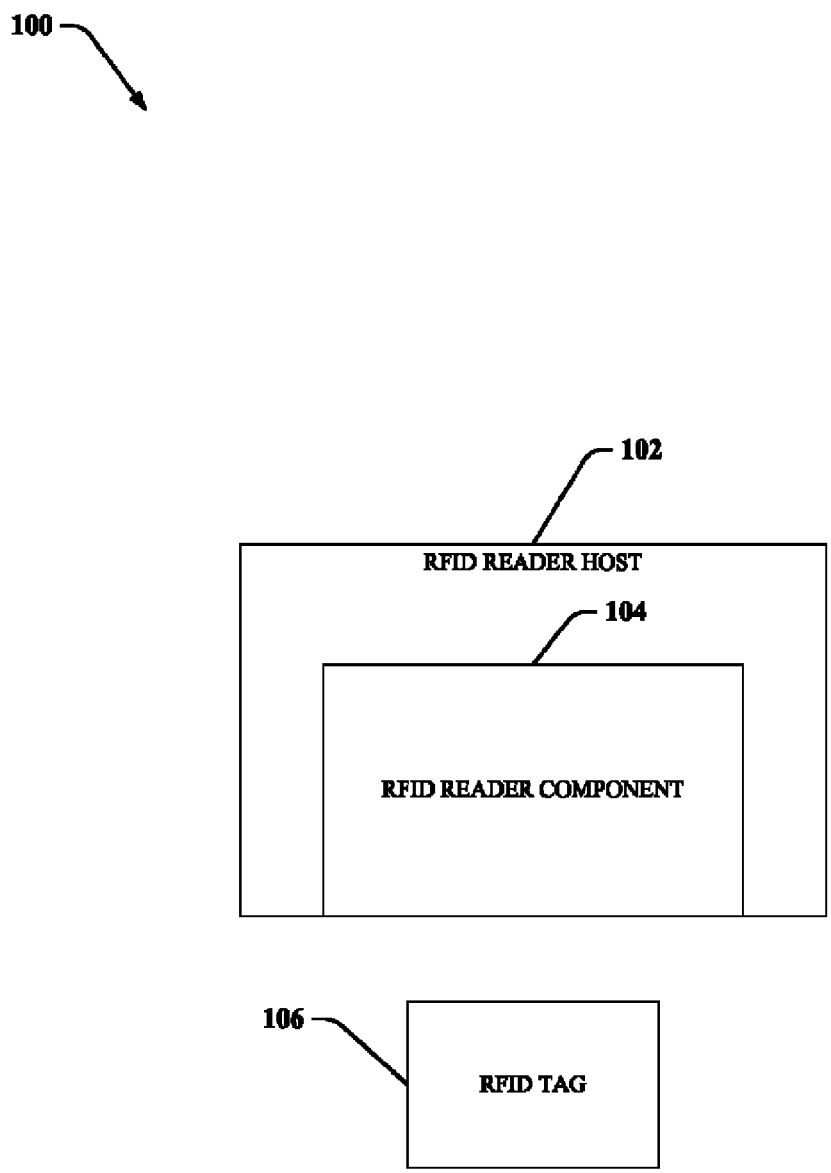
FIG. 1 illustrates an embodiment of a system for controlling the duty cycle of an RFID reader module to prevent a thermal shutdown.

FIG. 1 is a block diagram overview of the thermally controlled duty cycle regulated system 100. The thermally controlled duty cycle regulated system 100 comprises an RFID reader host component 102, an RFID reader component 104 and an RFID tag component 106. It should be noted that the RFID reader host component 102 is separate from the RFID reader component 104 and therefore does not necessarily meet all of operational requirements of the RFID reader component 104. The RFID reader host component 102 incorporates the RFID reader component 104 and provides power to the RFID reader component and communications connectivity. In another aspect, the RFID reader host component 102 is expected to provide a heat sink for the RFID reader component 104 so excess heat can be removed from the RFID reader component. It should be noted that not all RFID reader host components are designed to provide a sufficient heat sink under all operating conditions of the RFID reader component 104.

RFID reader component 104 provides the ability for interaction with the RFID reader host component 102 and the RFID tag component 106. The RFID reader component 104 provides a communicative connection to the RFID reader host component 102 allowing the RFID reader host component 102 to send control commands such as a read command to the RFID reader component 104 and allowing the RFID reader component 104 to return temperature trend data to the RFID reader host component 102.

In another aspect, the RFID reader component 104 provides the ability to measure the temperature of the RFID reader component 104 and optionally the surrounding environment. The temperature measurements obtained by the RFID reader component 104 are used as they are taken for analysis of the trend in heat generation, for controlling the heat generation through RFID tag component 106 read duty cycle control and for archiving for providing temperature trend data to the RFID reader host component 102.

Further, the RFID reader component 104 provides the ability to analyze the temperature data with regard to the rate of read requests from the RFID reader host and the ambient temperature and provide predictive control for preventing thermal shutdown of the RFID reader component 104. Additionally, the RFID reader component 104 provides the ability to insert a proportional delay in the duty cycle of the RFID reader component based on the temperature of the hardware implementing the RFID reader component 104. The proportional delay allows the RFID reader component to continue functioning at a lower rate of reading under conditions that otherwise would require a thermal shutdown of the RFID reader component 104.

In another aspect, the RFID reader component 104 provides the ability to store data associated with the RFID reader component. The stored data comprises data collected from the temperature measuring instrumentation, data based on the current configuration of the RFID reader component and system data required for the RFID reader component operation.

Further, the RFID reader component 104 can operate in a trigger mode. When the triggered mode is initiated by the RFID reader host component 102, the RFID reader component 104 sets the duty-cycle to a peak read rate. The RFID reader component 104 maintains this peak read rate for the duration of the triggered cycle and only reduces the duty cycle to prevent thermal shutdown.

RFID tag component 106 provides a data source for the RFID reader component 104. The RFID tag component 106 can remain stationary allowing the RFID reader component to pass by while reading. For example, the user can install the RFID reader component 104 in a handheld inventory control RFID reader host 102 device. A technician can then walk through the warehouse taking the inventory for later analysis. In another aspect, the RFID tag component 106 can be in motion with the RFID reader component 104 mounted in a stationary fashion. For example, the user can install the RFID reader component 104 in a RFID reader host 102 device mounted at a tollbooth with the RFID tag 106 component attached to a vehicle passing through the tollbooth.

Figure 2:
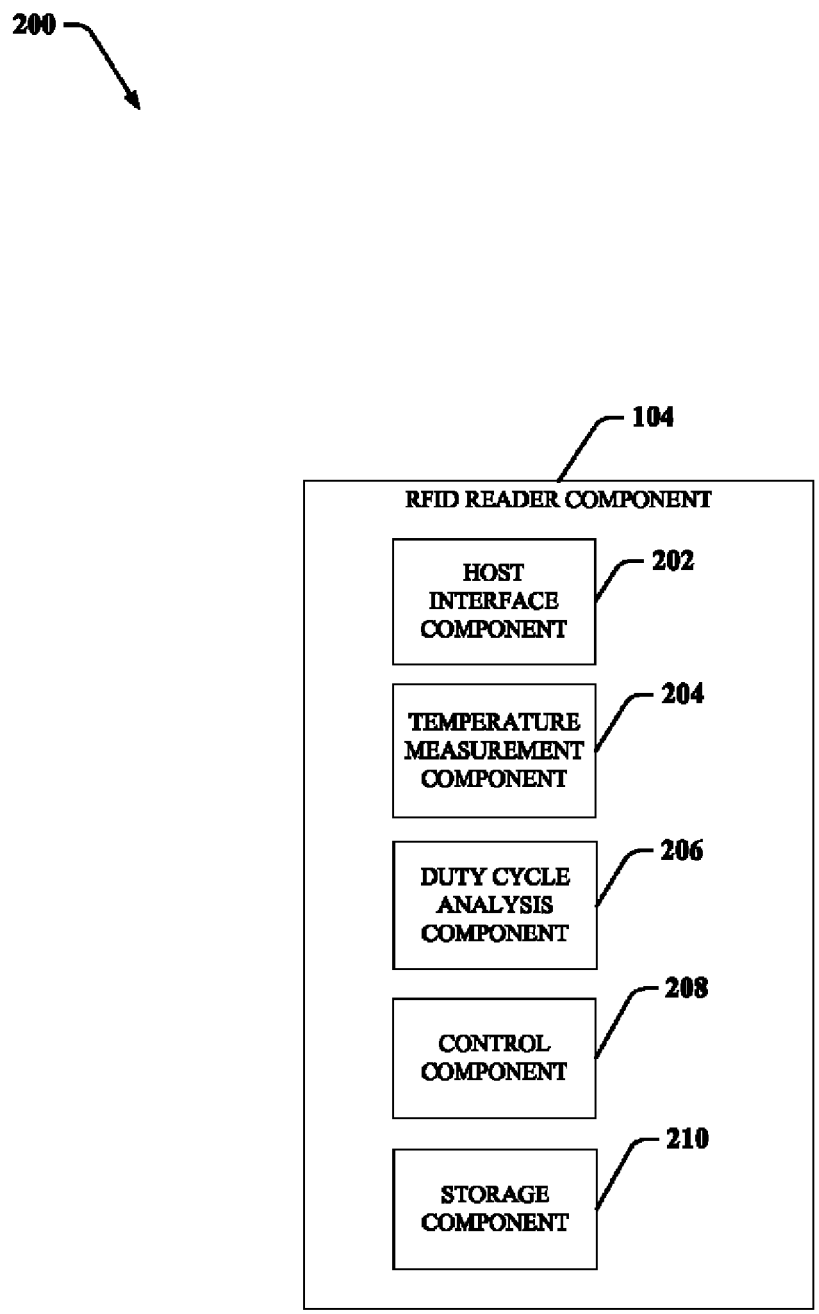
FIG. 2 illustrates the associated communication, measurement, analysis, control and storage components of an RFID reader module.

FIG. 2 depicts an RFID reader component 104 comprising the host interface component 202, the temperature measurement component 204, the duty cycle analysis component 206, the control component 208 and the storage component 210. The host interface component 202 provides the ability to establish communications with the RFID reader host component 102. In one aspect, the RFID reader host component 102 uses this interface to send commands to the RFID reader component 104. For example, the RFID reader host component 102 device can send an RFID read tag command to the RFID reader component 104 causing the RFID reader component 104 to begin a read cycle.

In another aspect of the subject innovation, the RFID reader component 104 can use the host interface component 202 to send archived data from the storage component 210 to the host for further analysis and distribution. For example, a user can manually instruct the RFID reader component 104 to upload its database of archived temperature data so the user can determine the efficiency of operation of a newly designed RFID reader host component 102 device.

The temperature measurement component 204, in one aspect, provides the ability to measure the temperature of the electrical hardware included in the implementation of the RFID reader component 104. The hardware has an upper thermal limit of operation and is shutdown if the temperature of the hardware components reaches this limit. For example, in one non-limiting implementation, the design includes a thermocouple attached to the processor providing the computational power for the RFID reader component 104. The temperature measurement component 204 reads temperature data from the thermocouple and provides the data to the analysis component 206 and the control component 208 for further action to protect the RFID reader component 104 from thermal shutdown.

In another aspect, the temperature measurement component 204 can provide the ability to measure the ambient temperature. For example, a non-limiting implementation can include a thermocouple thermally isolated from any heat generating hardware components and directed to reading the temperature of the environment surrounding the RFID reader component 104 and the RFID reader host component 102. The temperature measurement component 204 can read temperature data from this thermocouple and provide the data to the analysis component 206 and the control component 208 for further action to protect the RFID reader component 104 from thermal shutdown.

The duty cycle analysis component 206 provides the ability to receive newly sampled data from the temperature measurement component 204 and archived data from the storage component 210. The duty cycle analysis component 206 can then perform calculations allowing the prediction of the temperature trend of RFID reader component 104 with respect to the future rate at which the RFID reader component 104 can sample data from RFID tags 106 without reaching a temperature requiring a shutdown of the hardware components for thermal protection.

In one non-limiting example, the duty cycle analysis component 206 can extrapolate a linear prediction of the proportional delay for the duty cycle that allows the RFID reader component to operate at the maximum read rate without incurring a thermal shutdown. In another non-limiting example, the duty cycle analysis component 206 can implement an artificial intelligence component to perform an analysis on the real-time and historical temperature trend data and again determine the minimum allowable duty cycle delay to prevent the thermal shutdown of the RFID reader component 104.

In another aspect, the duty cycle analysis component 206 can monitor configured trigger points including but not limited to clock times and temperature events to upload temperature profile data to the RFID reader host device. In one non-limiting example, the duty cycle analysis component 206 can monitor the temperature of the RFID reader component 104 for a temperature that exceeds at preconfigured value. When the RFID reader component 104 temperature exceeds the preconfigured value, the duty cycle analysis component 206 can upload the archived data from the storage component 210 to the RFID reader host component 102 for further analysis or for distribution to other locations. In another non-limiting example, the duty cycle analysis component 206 can determine that the duty cycle delay is at an unexpectedly high value for the rate of RFID tag 106 reading and ambient temperature. The duty cycle analysis component 206 can then notify the RFID reader host device 102 of an alarm indicating possible hardware failure.

Further, the duty cycle analysis component can generate reports providing information on the efficiency of operation of the RFID reader with respect to the thermal capabilities of the RFID reader host. For example, an efficiency report can illustrate that for a particular RFID reader, the RFID reader host requires a better heat sink for optimal operation in the current environmental setting. The duty cycle analysis component can also distribute the generated reports to other devices and locations for shared analysis.

The control component 208, in one aspect, provides the ability to insert a delay element and the logic to set and update the delay value in the duty cycle loop of an RFID reader component 104. The control component 208 receives information from the duty cycle analysis component 206 regarding the predicted behavior of the temperature trend for the RFID reader component 104. Further, the control component 208 receives real-time temperature data from the temperature measurement component 204. The control component adjusts the duty cycle delay value based on the real-time temperature data with a bias based on the predicted future temperature information.

In one non-limiting example, the control component can receive real-time temperature data from the temperature measuring component 204 requiring a greater proportional delay value for the control loop but also receives information from the duty cycle analysis component indicating a projected decline in ambient temperature. The scenario describes a worker transitioning from a heated office complex to an unheated warehouse in the winter months in a northern climate. The control component 208 can bias the change to the delay value based on the information that the ambient heat sink is becoming much more effective at dissipating heat and allowing the RFID reader component 104 to continue operating at a greater read rate than would normally be the case for the real-time temperature readings.

The storage component 210, in one aspect, provides the ability to archive temperature data for analysis and uploading to the RFID reader host component 102 device. The storage component 210 maintains archived temperature data for as long as storage is available with the oldest data flushed as required. In another aspect, the storage component 210 maintains configuration data related to the operation of the RFID reader. For example, the storage component 210 maintains the value for the duty cycle delay and other parameters of the control loop to prevent their loss during loss of power situations. In another aspect, the storage component 210 provides the ability to maintain configured action events and clock times to allow the duty cycle analysis component to upload the temperature trend data based on the occurrence of one of the configured events or the passage of a configured clock time.

Figure 3:
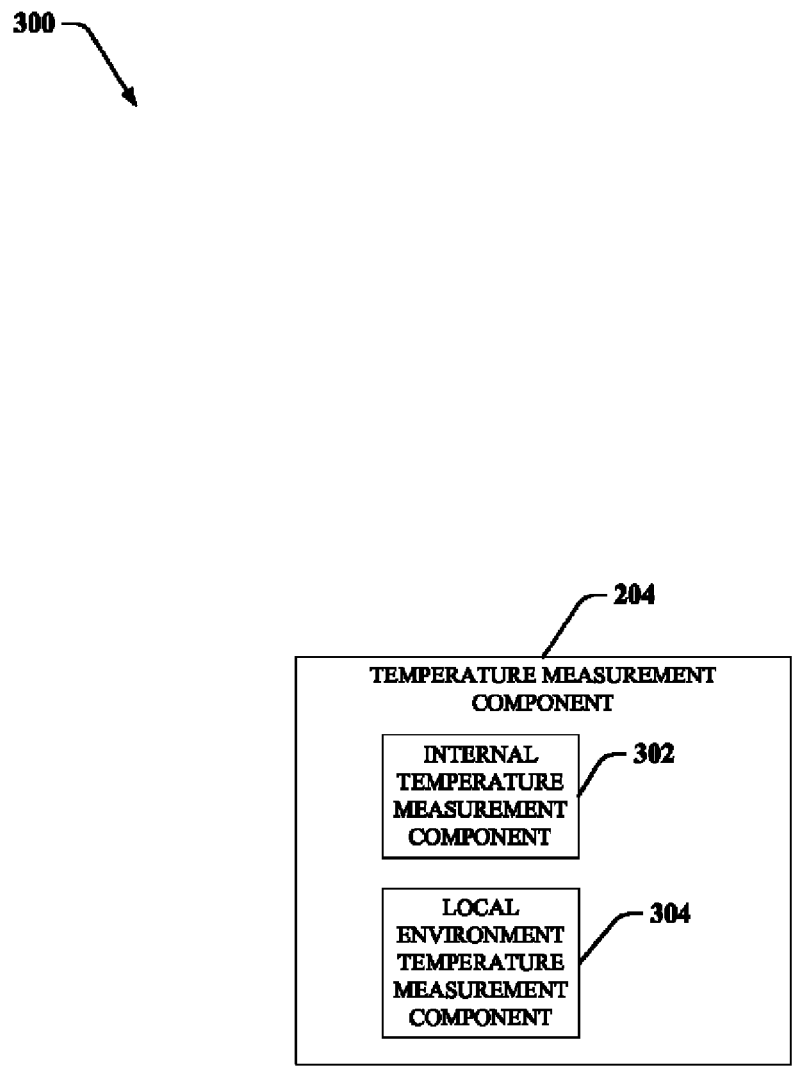
FIG. 3 illustrates the associated internal and external environment temperature measuring components of an RFID reader temperature measurement component.

FIG. 3 depicts a temperature measurement component comprising an internal temperature measurement component 302 and a local environment temperature measurement component 304. The internal temperature measurement component 302 provides the ability for the temperature measurement component 204 of the RFID reader component 104 to measure the temperature of the hardware components implementing the RFID reader component 104. In one non-limiting example of the subject innovation, the internal temperature measurement component 302 is a thermocouple attached to the face of a processor performing the logic and calculations of the RFID reader component 104. In another non-limiting example, the internal temperature measurement component 302 is a thermistor circuit intended for the temperature range of operation of the RFID reader component 104 hardware.

The local environment temperature measurement component 304 provides the ability to measure the ambient temperature surrounding the RFID reader component 104 and the RFID reader host component 102. The environment temperature measurement component 304 is mounted in a location insulated from heat generated by the RFID reader component 104 and the RFID reader host component 102. As described above for the internal temperature measurement component 302, example non-limiting implementations of environment temperature measurement components 304 include thermocouples and thermistor circuits.

Figure 4:
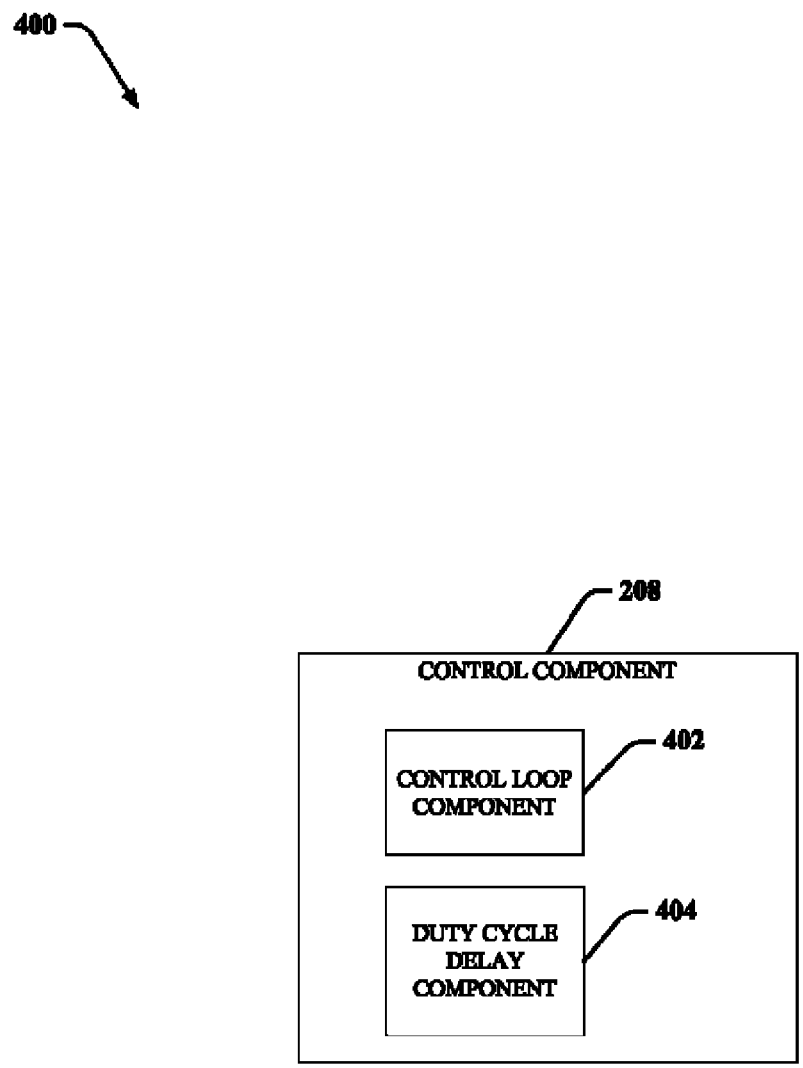
FIG. 4 illustrates the associated control loop and duty cycle delay components of an RFID reader control component.

FIG. 4 depicts a control component 208 comprising a control loop component 402, and a duty cycle delay component 404. The control loop component 402 provides the ability to monitor the temperature inputs from the temperature measurement component 204 and execute a thermal shutdown of the RFID reader component 104 should the temperature reach a value known to harm the RFID reader component 104 hardware. In one non-limiting example, the control loop is a proportional-integral-derivative (PID) control loop tuned to the characteristics of the RFID reader component 104 hardware.

In another aspect of the control component 208, the duty cycle delay component 404 integrates into the control loop component 402 and provides a mechanism for proportionally delaying the duty cycle of the RFID reader component 104. In one non-limiting example, the duty cycle delay component is a location for storing a delay value that the control loop component 402 must count through on each pass of the control loop.

Figure 5:
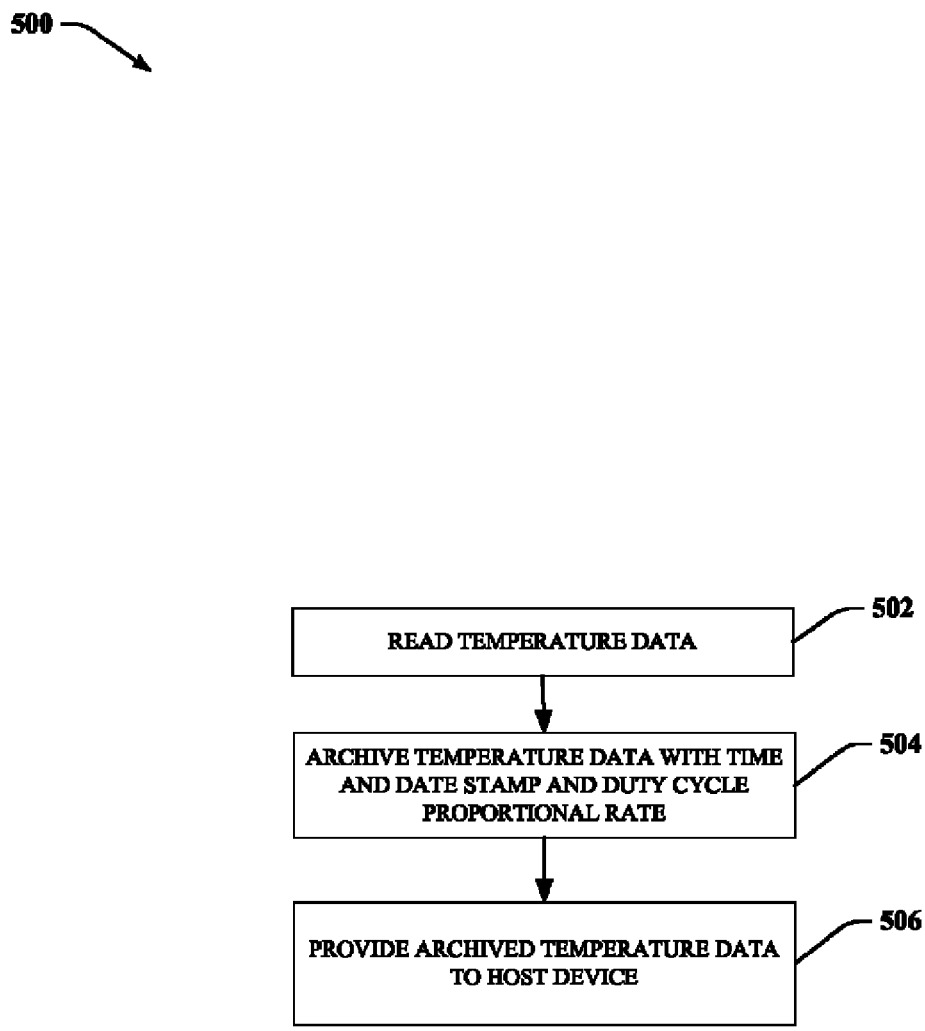
FIG. 5 illustrates an embodiment of a method of an RFID reader component collecting, archiving and distributing data on the operational temperature trends of the RFID reader component.

Referring now to FIG. 5, illustrated is a method for collecting, archiving and reporting temperature profile and duty cycle delay value data. Beginning at step 502, a temperature measurement component 204 reads a temperature value from an internal temperature measurement component 302 and/or the local environment temperature measurement component 304. The temperature measurement component 204 can time and date stamp the temperature data to preserve the chronology of the temperature data collection.

Next at step 504, the collected and possibly time and date stamped temperature data is communicated to the storage component 210 for archiving. In addition to the temperature data, the duty cycle delay component 404 of the control component 208 can provide the duty cycle delay value for archiving. Similar to the temperature data, the duty cycle delay component can provide a time and date stamp of when the duty cycle delay component 404 changed the duty cycle delay value.

Next at step 506, the provided data is archived on the storage component 210. The storage component maintains the data in the order provided and on command will upload the data to the RFID reader host component 102. The RFID reader host component 102 can trigger the upload manually or automatically, based on a previously defined event or time. After uploading, based on the user specified storage component 210 configuration, the storage component can delete the uploaded data from the storage component 210 to provide space for newly collected data.

Figure 6:
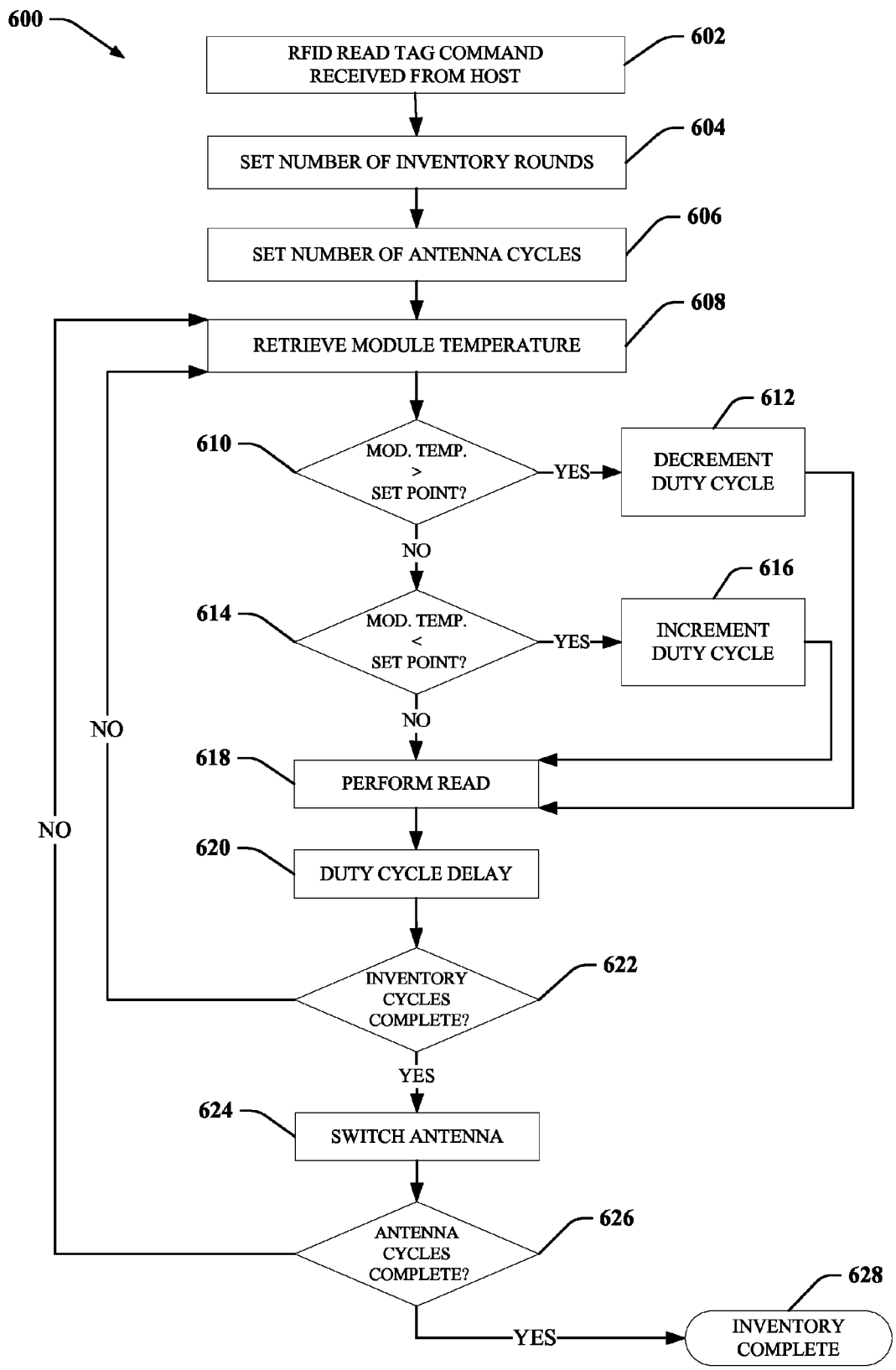
FIG. 6 illustrates an embodiment of a method of an RFID reader component sampling control data and adjusting the duty cycle of an RFID reader module to prevent thermal shutdown.

Looking to figure FIG. 6, illustrated is a method 600 of managing the duty cycle of an RFID reader module to prevent the RFID reader module from overheating and thermal shutdown. Beginning at step 602, the RFID reader component 104 receives an RFID read tag command from the RFID reader host component 102. It should be noted that the RFID reader can receive and act on other commands received from the RFID reader host component 102. For example, the RFID reader host component 102 can send a command instructing the RFID reader to upload archived data from the storage component 210 based configured events. Configured events include but are not limited to uploading data when the storage component nears full capacity, uploading data when a particular measured temperature is detected and uploading data when a particular clock time is reached.

At step 604, the RFID reader component 104 sets the number of inventory rounds to perform. The user can select the number of inventory rounds from a default value maintained by the RFID reader component or supplied by the RFID reader component host 102 in the RFID read tag command sent to the RFID reader component 104.

Next, at step 606, the RFID reader component 104 sets the number of antenna cycles. The RFID reader component can contain more than a single antenna system and the RFID reader component 104 provides the ability to interrogate RFID tags enabled by the different antenna systems. At step 608, the temperature measurement component 204 retrieves the module temperature of the hardware implementing the RFID reader component 104.

Next, at step 610, the RFID reader component 104 determines if the module temperature is greater than the predetermined high temperature value. If the module temperature is greater than the predetermined high temperature value, then the method 600 proceeds to step 612 and the control component 208 proportionally decreases the duty cycle rate by increasing the duty cycle delay. After decreasing the duty cycle rate, the method 600 continues to step 618 where the RFID reader component performs the read of the RFID tag 106. If the module temperature is not greater than the predetermined high temperature value, then the method 600 proceeds to step 614 and the RFID reader component determines if the module temperature is lower than the predetermined low temperature value. If the module temperature is lower than the predetermined low temperature value, then the method 600 proceeds to step 616 and the control component 208 proportionally increases the duty cycle rate by decreasing the duty cycle delay. After increasing the duty cycle rate, the method 600 continues to step 618 where the RFID reader component performs the read of the RFID tag 106.

Proceeding at step 620, the method 600 inserts a delay in the duty cycle to slow the reading rate of the RFID reader component 104. One non-limiting method of delay is by counting down from a predefined delay count to zero. Once the count reaches zero then the duty cycle loop can proceed to step 622. In another non-limiting method, delay component 404 programs a timer with the predefined delay value and the timer notifies the delay component 404 when the delay time has expired. After receiving the notification, the duty cycle loop proceeds to step 622.

Next, at step 622, the method 600 determines if the number of inventory cycles is complete. If the number of inventory cycles is not complete then the method 600 returns to step 608 and continues with another iteration of retrieving the module temperature. If the number of inventory cycles is complete, then the method 600 continues to step 624. Next, at step 624, the method 600 switches antennas to inspect another frequency and/or antenna polarization and/or range and continues to step 628. At step 628, the method determines if the number of antenna cycles is complete. If the number of antenna cycles is not complete, then the method 600 returns to step 608 and continues with another iteration of retrieving the module temperature. If the number of antenna cycles is complete, then the method 600 proceeds to step 628 and an inventory is complete.

Figure 7:
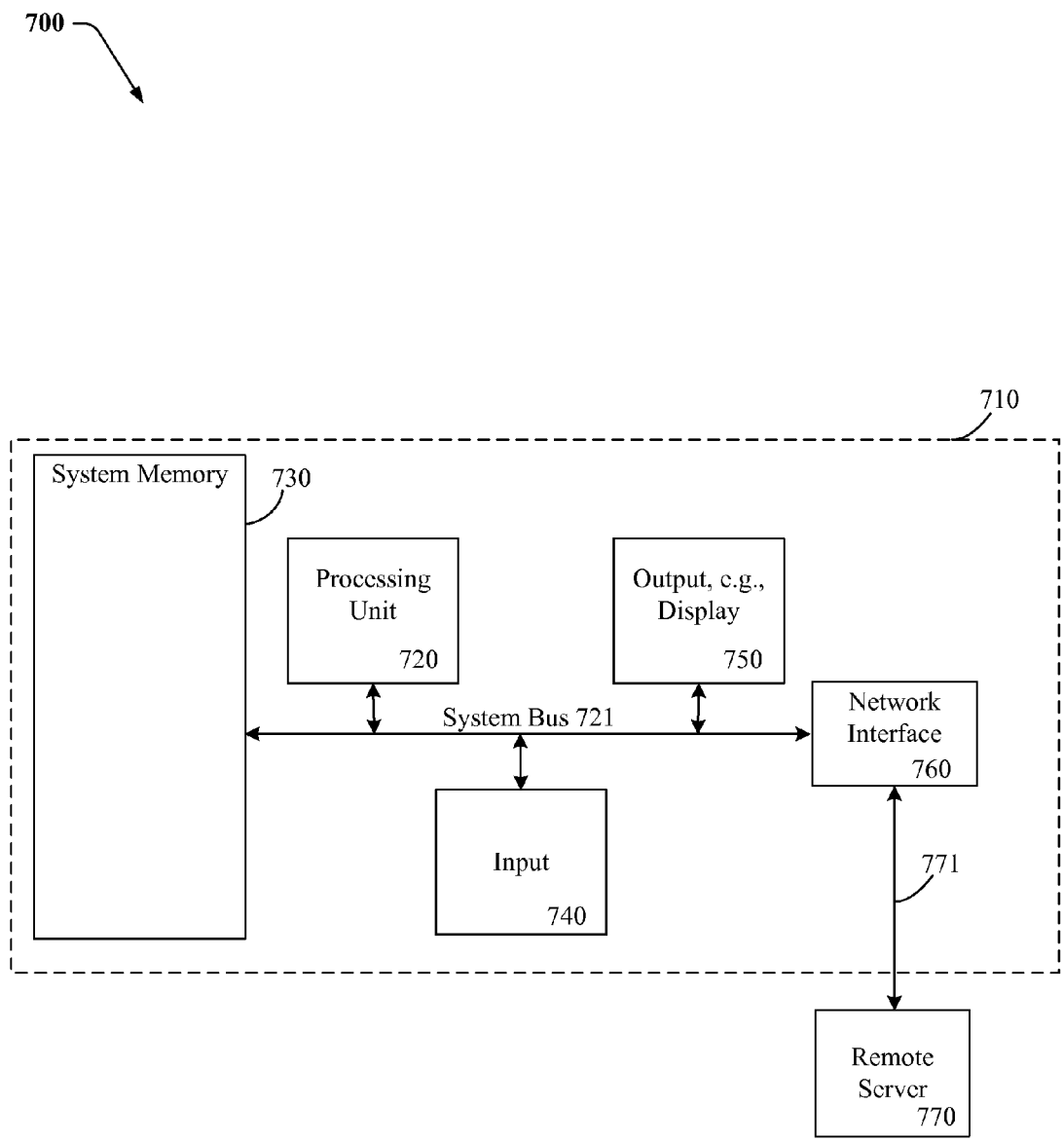
FIG. 7 illustrates a block diagram of an exemplary, non-limiting operating environment in which various aspects described herein can function.

FIG. 7 illustrates an example of a suitable computing system environment 700 implementing the claimed subject matter. Although as made clear above, the computing system environment 700 is only one example of a suitable computing environment for a mobile device and is not intended to suggest any limitation as to the scope of use or functionality of the claimed subject matter. Further, the computing environment 700 is not intended to suggest any dependency or requirement relating to the claimed subject matter and any one or combination of components illustrated in the example computing environment 700.

With reference to FIG. 7, an example of a remote device for implementing various aspects described herein includes a general purpose computing device in the form of a computer 710. Components of computer 710 can include, but are not limited to, a processing unit 720, a system memory 730, and a system bus 721 that couples various system components including the system memory 730 to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media accessible by computer 710. By way of example, and not limitation, computer readable media can comprise computer storage media. Computer storage media includes volatile and nonvolatile as well as removable and non-removable media implemented in any method or technology for storage of information such as computer readable instructions, data structures, program modules or other data.

Computer storage media includes, but is not limited to, RAM, ROM, EEPROM, flash memory or other memory technology, CDROM, digital video disks (DVD) or other optical disk storage, magnetic cassettes, magnetic tape, magnetic disk storage or other magnetic storage devices, or any other medium usable to store the desired information and which can be accessed by computer 710.

Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing basic routines that help to transfer information between elements within computer 710, such as during start-up, can be stored in memory 730. Memory 730 can also contain data and/or program modules that are immediately accessible to and/or presently operated on by processing unit 720. By way of non-limiting example, memory 730 can also include an operating system, application programs, other program modules, and program data.

The computer 710 can also include other removable/non-removable, volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media usable in the exemplary operating environment include, but are not limited to, magnetic tape cassettes, flash memory cards, digital versatile disks, digital video tape, solid state RAM, solid state ROM and the like. In a non-limiting example, the computer 710 can include a hard disk drive connected to the system bus 721 through a non-removable memory interface. In another non-limiting example, the computer 710 can include a magnetic disk drive or optical disk drive connected to the system bus 721 by a removable memory interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 720 through user input 740 and associated interface(s) that are coupled to the system bus 721, but can be connected by other interface and bus structures, such as a parallel port, game port or a universal serial bus (USB). A graphics subsystem can also be connected to the system bus 721. In addition, a monitor or other type of display device can be connected to the system bus 721 via an interface, such as output interface 750, which can in turn communicate with video memory. In addition to a monitor, computers can also include other peripheral output devices, such as speakers and/or a printer, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such local area network (LAN) or a wide area network (WAN), but can also include other networks/buses. Such networking environments are commonplace in homes, offices, enterprise-wide computer networks, intranets and the Internet.

The computer 710 includes a receiver/transmitter 780 for activating the RFID tag and receiving the information transmitted by the RFID tag after transmitter energizes the RFID tag. The receiver/transmitter 780 can contain a plurality of antennas suitable for different frequencies of operation or different ranges, and/or polarizations to communicate with the RFID tag.

When used in a LAN networking environment, the computer 710 connects to the LAN 771 through a network interface or adapter. When used in a WAN networking environment, the computer 710 can include a communications component, such as a modem, or other means for establishing communications over the WAN, such as the Internet. A communications component, such as a modem, which can be internal or external, connects to the system bus 721 via the user input interface at input 740 and/or other appropriate mechanism. In a networked environment, program modules depicted relative to the computer 710, or portions thereof, can be stored in a remote memory storage device. It should be appreciated that the network connections shown and described are exemplary and other means of establishing a communications link between the computers can be used.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle layers, such as a management layer, can be provided to communicatively couple to such sub-components in order to provide integrated functionality. Any components described herein may also interact with one or more other components not specifically described herein but generally known by those of skill in the art.

In view of the exemplary systems described supra, methodologies that can be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, can be implemented which achieve the same or a similar result. Moreover, not all illustrated blocks are required to implement the methodologies described hereinafter. In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

What is claimed is:

1. A computer-readable media encoded with a computer program for a system for preventing thermal shutdown of radio frequency identification (RFID) reader by automatically adjusting the duty cycle of the RFID reader, the system comprising:
    a temperature measurement component for determining the temperature of the RFID reader; and
    a control component for providing a duty cycle delay value storage location, calculating the duty cycle delay value based on the measured temperature and delaying the duty cycle based on the calculated delay value, the control component comprises a delay loop integrated into a proportional-integral-derivative (PID) loop, the measured temperature to be input to the PID which then provides the duty cycle delay value output for delaying the RFID reader duty cycle in proportion to the measured temperature.

2. The system of claim 1, further comprising an analysis component operable to notify a host device of the RFID reader with an alarm indicating possible RFID reader failure in response to the measured temperature and a rate of RFID tag reading.

3. The system of claim 1, wherein the PID loop is tuned to characteristics of the RFID reader.

4. The system of claim 1, the system further comprises a second temperature measurement component for determining an ambient temperature, and further comprises an analysis component for calculating an adjustment to the calculated duty cycle delay value based on a change in ambient temperature and a predicted effect the change in ambient temperature will have on the RFID reader temperature so as to provide predictive control of the RFID reader temperature.

5. The system of claim 4, the analysis component predicting a new duty cycle delay value based on historical duty cycle delay value trends.

6. The system of claim 5, the analysis component for analyzing the measured temperature with regard to a rate of read requests from a host of the RFID reader and the ambient temperature and provide predictive control for preventing thermal shutdown of the RFID reader.

7. The system of claim 1, wherein the RFID reader sets a number of inventory rounds to perform.

8. The system of claim 1, the delay loop comprises programming a timer with a duty cycle delay value time and waiting for notification of timer completion before continuing the RFID reader duty cycle.

9. The system of claim 1, wherein the RFID reader sets a number of antenna cycles that switch antennas to inspect another different aspect of RFID tags.

10. A method for preventing thermal shutdown of a radio frequency identification (RFID) reader component, the method comprising:
    employing a processor to execute the following computer executable acts stored on a computer readable medium, the processor including a delay loop integrated into a proportional-integral-derivative (PID) loop:
    receiving a read RFID tag command from a host device;
    measuring the temperature of the RFID reader, the measured temperature to be input to the PID;
    calculating a duty cycle delay value based on the measured temperature, the duty cycle delay value being in proportion to the measured temperature and being output from the PID;
    reading data from an RFID tag; and
    delaying the duty cycle based on the calculated delay value from the PID.

11. The method of claim 10, further comprising measuring the ambient temperature and predicting adjustments to the calculated duty cycle delay value based on a change in ambient temperature and a predicted effect the change in ambient temperature will have on the RFID reader temperature so as to provide predictive control of the RFID reader temperature.

12. The method of claim 10, the method further comprises analyzing archived temperature data and predicting a duty cycle delay value based on the archived temperature data trend.

13. A system for automatically preventing thermal shutdown of radio frequency identification (RFID reader component, the system comprising:
- means for receiving a read RFID tag command from a host device;
- means for measuring the temperature of the RFID reader;
- a delay loop integrated into a proportional-integral-derivative (PID) loop, the measured temperature to be input to the PID, whereupon the PID calculating a duty cycle delay value based on the measured temperature, the duty cycle delay value being in proportion to the measured temperature and being output from the PID;
- means for reading data from an RFID tag; and
- means for adjusting the duty cycle delay based on the calculated delay value from the PID.

14. The system of claim 13, wherein the means for adjusting includes.

15. The system of claim 13, further comprising:
- means for measuring the ambient temperature; and
- means for adjusting the calculated duty cycle delay value based on a change in measured ambient temperature and a predicted effect the change in ambient temperature will have on the RFID reader temperature so as to provide predictive control of the RFID reader temperature.

16. The system of claim 14, further comprising:
- means for analyzing the archived temperature data and the duty cycle delay data and generating a report based on a heatsink efficiency in a current environmental setting of RFID reader operation; and
- means for automatically distributing the generated report to other locations.

17. A method for preventing thermal shutdown of radio frequency identification (RFID) reader component, the method comprising:
- employing a processor to execute the following computer executable acts stored on a computer readable medium, the processor including a delay loop integrated into a proportional-integral-derivative (PID) loop:
- receiving a read trigger from a host device;
- operating the RFID reader at maximum read rate;
- measuring the temperature of the RFID reader, the measured temperature to be input to the PID;
- calculating a duty cycle delay value based on the measured temperature, the duty cycle delay value being in proportion to the measured temperature and being output from the PID; and
- adding the calculated delay value from the PID to the duty cycle if the RFID reader temperature approaches a value indicating thermal shutdown before the end of the triggered read.

* * * * *

UNITED STATES PATENT AND TRADEMARK OFFICE
CERTIFICATE OF CORRECTION

| | | |
|---|---|---|
| PATENT NO. | : 8,199,015 B2 | Page 1 of 1 |
| APPLICATION NO. | : 12/477367 | |
| DATED | : June 12, 2012 | |
| INVENTOR(S) | : Sandler et al. | |

It is certified that error appears in the above-identified patent and that said Letters Patent is hereby corrected as shown below:

Title page, Item (75), under "Inventors", in Column 1, Line 1, delete "I" and insert -- I. --, therefor.

Signed and Sealed this
Eighth Day of January, 2013

David J. Kappos
*Director of the United States Patent and Trademark Office*